(12) United States Patent
Van Steijn

(10) Patent No.: US 9,781,940 B2
(45) Date of Patent: Oct. 10, 2017

(54) POULTRY PROCESSING LINE

(71) Applicant: Meyn Food Processing Technology B.V.

(72) Inventor: Aloysius Christianus Maria Van Steijn, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 15/269,296

(22) Filed: Sep. 19, 2016

(65) Prior Publication Data
US 2017/0079292 A1 Mar. 23, 2017

(30) Foreign Application Priority Data
Sep. 23, 2015 (NL) ...................................... 2015494

(51) Int. Cl.
| | |
|---|---|
| B65G 49/06 | (2006.01) |
| A22C 21/00 | (2006.01) |
| A22B 7/00 | (2006.01) |
| B65G 17/20 | (2006.01) |
| B65G 17/32 | (2006.01) |

(52) U.S. Cl.
CPC .......... *A22C 21/0053* (2013.01); *A22B 7/001* (2013.01); *A22B 7/002* (2013.01); *A22B 7/003* (2013.01); *A22B 7/004* (2013.01); *A22C 21/0007* (2013.01); *B65G 17/20* (2013.01); *B65G 17/32* (2013.01)

(58) Field of Classification Search
CPC ........ B65G 17/16; B65G 17/18; B65G 17/20; B65G 17/485
USPC ..................... 198/465.4, 678.1, 680, 803.15; 104/89–95, 172.4; 16/103
See application file for complete search history.

(56) References Cited

U.S. PATENT DOCUMENTS

| | | | | |
|---|---|---|---|---|
| 3,155,051 | A * | 11/1964 | Sherburne | B65G 9/002 104/94 |
| 5,125,498 | A * | 6/1992 | Meyn | B65G 47/61 198/465.4 |
| 6,764,393 | B1 * | 7/2004 | Hazenbroek | A22C 21/0007 452/188 |
| 6,811,480 | B2 * | 11/2004 | Moriarty | A22C 21/0007 452/179 |
| 2002/0090905 | A1 | 7/2002 | Moriarty | |
| 2008/0011588 | A1 | 1/2008 | Frost | |

FOREIGN PATENT DOCUMENTS

| | | |
|---|---|---|
| JP | S6093017 | 5/1985 |
| NL | 7100110 | 8/1971 |

* cited by examiner

*Primary Examiner* — William R Harp
(74) *Attorney, Agent, or Firm* — Dority & Manning, P.A.

(57) ABSTRACT

A poultry processing line with a conveying track and can include at least one carriage movable in the conveying track. Wheels on opposite sides of the carriage are mounted on an axle guided through a shaft or bore of the carriage, and are movable along supports for the respective wheels on opposite sides of the conveying track. The shaft or bore has a convex inner top surface and convex inner bottom surface as seen in the shaft or bore's longitudinal direction.

8 Claims, 5 Drawing Sheets

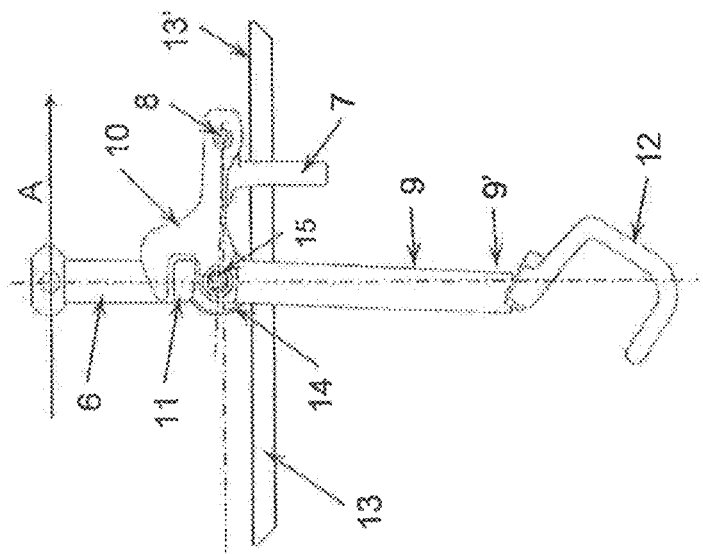
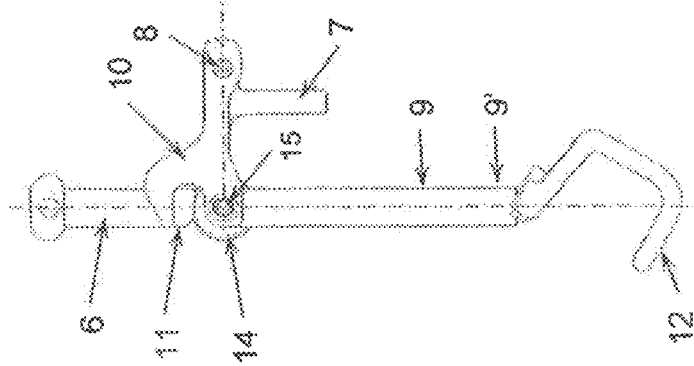

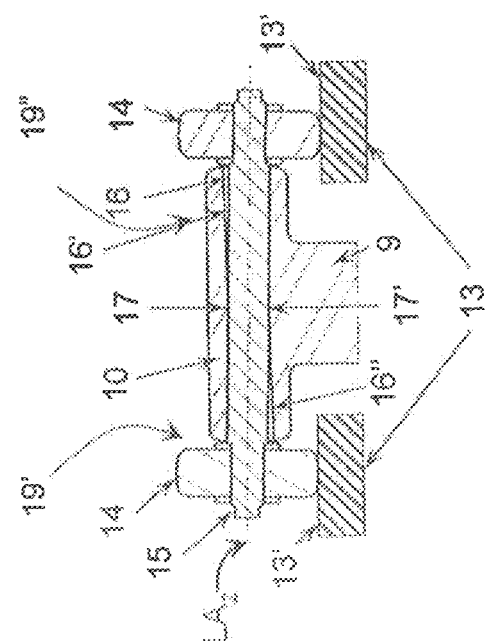
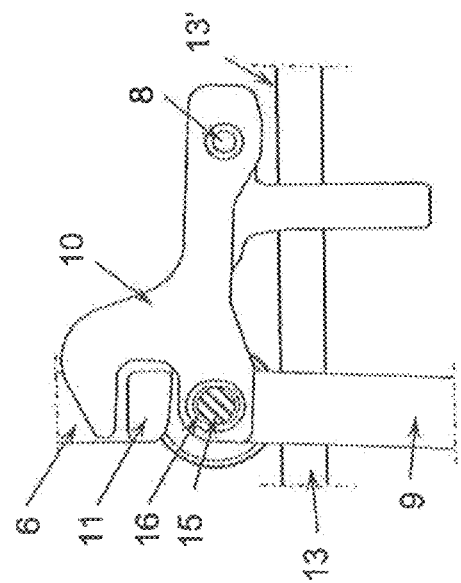

POULTRY PROCESSING LINE

PRIORITY STATEMENT

The present application claims priority under 35 U.S.C. §119 to Dutch Application No. 2015494, filed Sep. 23, 2015.

FIELD OF THE INVENTION

The subject matter of the present disclosure relates generally to a poultry processing line provided with a conveying track having at least one carriage or structure movable in the conveying track.

BACKGROUND OF THE INVENTION

A conventional poultry processing line is known from practice including a poultry processing line provided with a conveying track having a carriage movable in the conveying track. Such may be used for instance in a line wherein the supports for respective wheels of the carriage are mounted on weighing scales. The carriage or structure moving with the wheels rolling over the supports can then be measured and the weight of the poultry or poultry parts suspended or supported by the carriage can be derived from that measurement.

For accurate measuring of the weight of the poultry or poultry parts, it may be important that the carriage or structure is perfectly level. In practice, this can be problematic because a perfectly level carriage or structure requires that the supports for the wheels are perfectly level. To ensure that the supports for the wheels are perfectly level and remain perfectly level, high installation costs followed by intensive maintenance and correspondingly high maintenance costs are incurred.

SUMMARY OF THE INVENTION

In one exemplary aspect, it is an object of the invention to circumvent the necessity of ensuring that the supports are always perfectly level, while still ensuring that the carriage itself will be level when it moves over the supports of the conveyor line.

In another exemplary aspect, it is another object of the invention to make the processing line less sensitive to maintenance without compromising the accuracy of the orientation and positioning of the carriage moving along the supports of the conveyor line.

In general, the subject matter of the present disclosure relates generally to a poultry processing line provided with a conveying track and including at least one carriage or structure movable in the conveying track. Poultry or poultry parts are suspendable or supportable by the carriage or structure. The carriage or structure is provided with wheels on opposite sides of the carriage or structure that are mounted on an axle guided through a shaft or bore of the carriage or structure, and are movable along supports for the respective wheels on opposite sides of the conveying track so as to move the carriage or structure along the conveying track.

In a first exemplary embodiment of the invention, the shaft or bore of the processing line has a convex inner top surface and convex inner bottom surface as seen in the shaft or bore's longitudinal direction. This provides room for the axle guided through the shaft or bore to assume a slightly slanting position in the shaft or bore when it's wheels are resting on the supports on opposite sides of the conveyor line, while at the same time this ensures that the carriage will assume a perfectly level orientation with respect to the horizon under the influence of gravity.

In another exemplary aspect, preferably the bottom and top surfaces of the shaft or bore each have an apex at the shaft or bore's center. This arranges for a construction wherein the axle can enjoy on both sides or on both extremities of the shaft or bore a predefined amount of play exactly meeting the requirements of the case.

In another exemplary embodiment, the shaft or bore has a cross-sectional area in the middle of the shaft or bore that is circular, and a cross-sectional area on opposite extremities of the shaft or bore that is oval so as to provide the axle with the required play at the extremities of the shaft or bore.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention without limiting the claims thereto.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 and FIG. 6 show a first detail of the exemplary carrier in different positions; and FIGS. 7A and 7B shows a second detail of a structure according to an exemplary embodiment of the invention applied in a conveyor line in both a cross-sectional view (FIG. 7A) and in a side view (FIG. 7B).

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
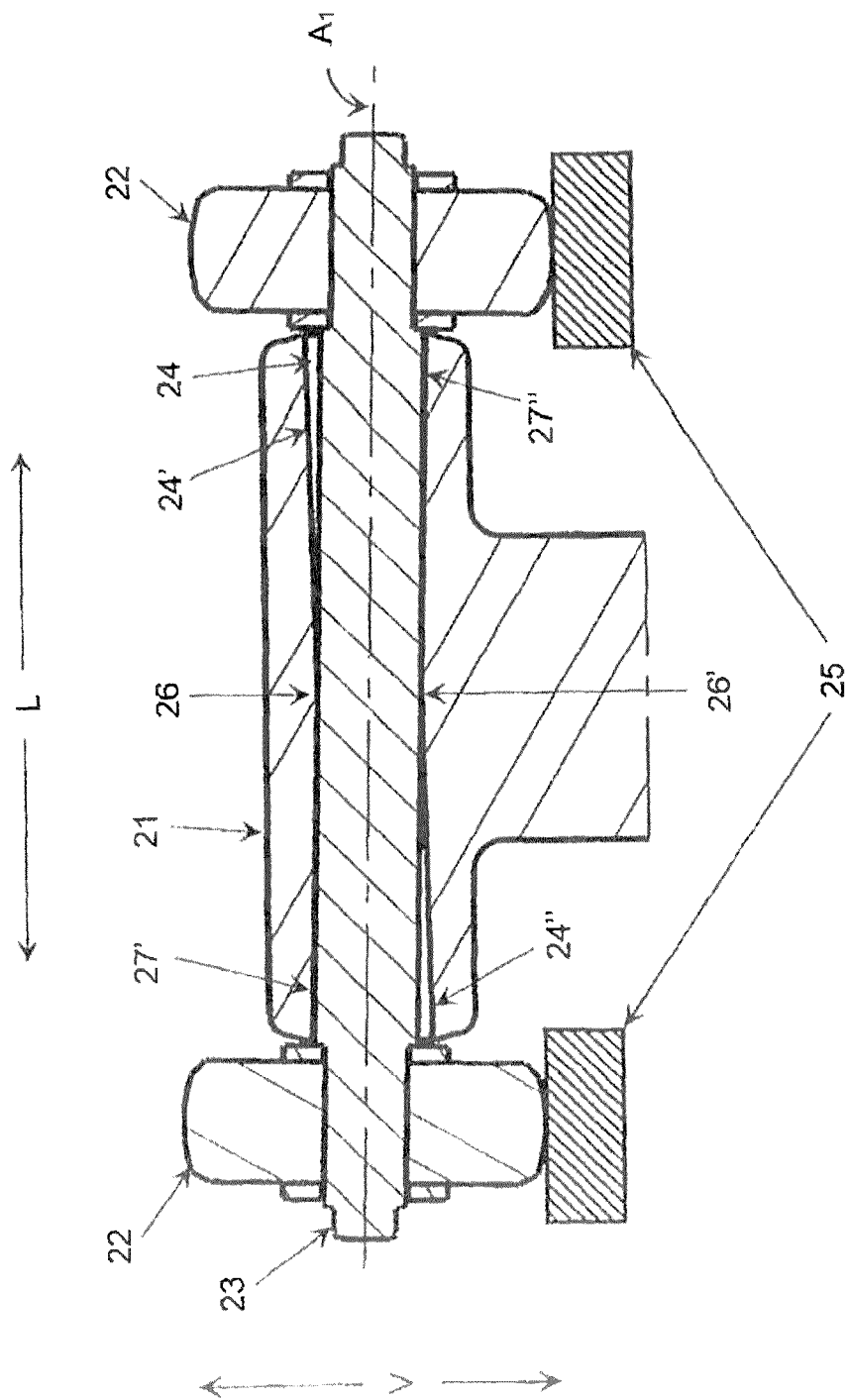
FIG. 1 shows a carriage or structure according to an exemplary embodiment of the invention.

FIG. 1 relates to a first exemplary embodiment of the invention wherein a carriage 21 is movable in a poultry processing line and wherein the carriage 21 follows a conveying track of this processing line. The processing line as such is not shown in FIG. 1 because such is not relevant to the understanding of the invention. Regardless, an exemplary processing line is illustrated in connection with another embodiment of the invention to be referred to hereinafter with reference to FIGS. 2-7. In a manner known to the skilled person and therefore also not further shown in this FIG. 1 for not being relevant to the understanding of the invention, poultry or poultry parts are suspendable or supportable by the carriage 21. FIGS. 2-7, however, do illustrate an exemplary suspended poultry. Suspended poultry parts could also be shown.

The carriage 21 is provided with wheels 22 on opposite sides of the carriage 21 that are mounted on an axle 23 (having longitudinal axis LAO guided through a shaft or bore 24 of the carriage 21. The carriage 21 is movable along supports 25 for the respective wheels 22, which supports 25 are placed on opposite sides of a conveying track of the processing line so as to enable moving the carriage 21 along the conveying track.

In an exemplary aspect of the invention, the shaft or bore 24 of the carriage 21 has a convex inner top surface 24' and a convex inner bottom surface 24" as seen in the longitudinal direction L of the shaft or bore 24. This is preferably embodied such that the bottom and top surfaces 24', 24" of the shaft or bore 24 have an apex 26 and 26' at the shaft or bore's center, wherein more preferably the shaft or bore 24 has a cross-sectional area in the middle of the shaft or bore 24 that is circular, and a cross-sectional area on opposite extremities 27', 27" of the shaft or bore 24 that is oval so as to provide the axle 23 with play at the extremities of the shaft or bore 24. In still another exemplary aspect, the distance D' along vertical direction V between bottom and top surfaces 24', 24" at apexes 26 and 26' is less than the distance D" along vertical direction V between bottom and top surfaces 24', 24" at extremities 27', 27".

This will be explained further in the following with reference to a second exemplary embodiment of the invention making reference to FIGS. 2-7 in which a structure according to exemplary embodiments of the invention is applied that forms part of a carrier for moving poultry or poultry parts along a conveying track of a processing line.

Figure 2:
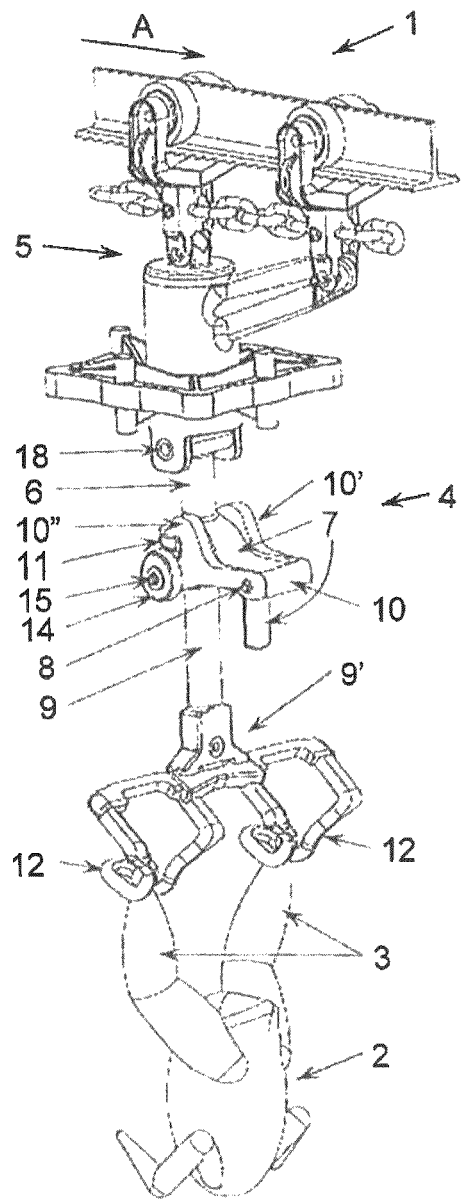
FIG. 2 is an isometric view of an exemplary carrier and part of a conveyor line in an exemplary embodiment of the invention.
Figure 3:
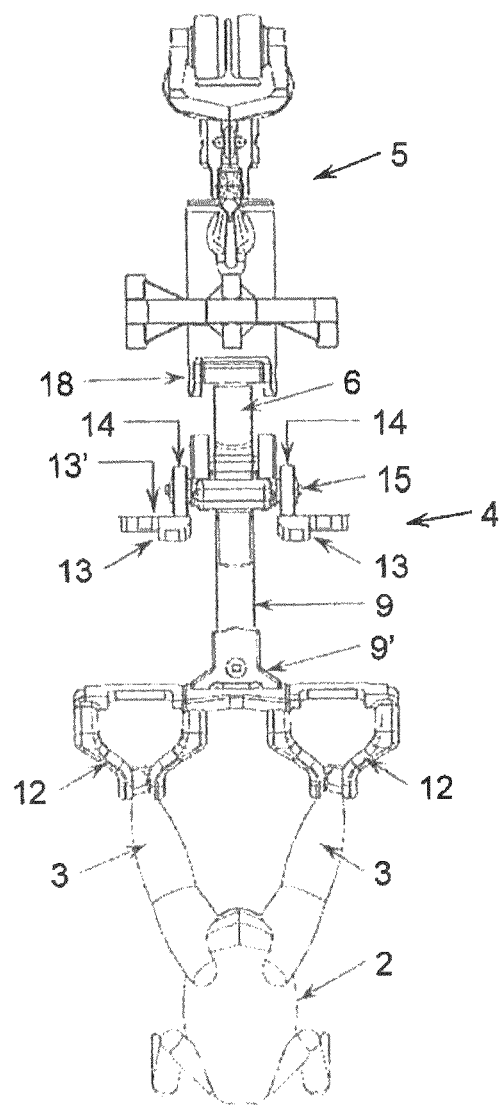
FIG. 3 is a frontal view of an exemplary carrier and part of a conveyor line in an exemplary embodiment of the invention.
Figure 4:
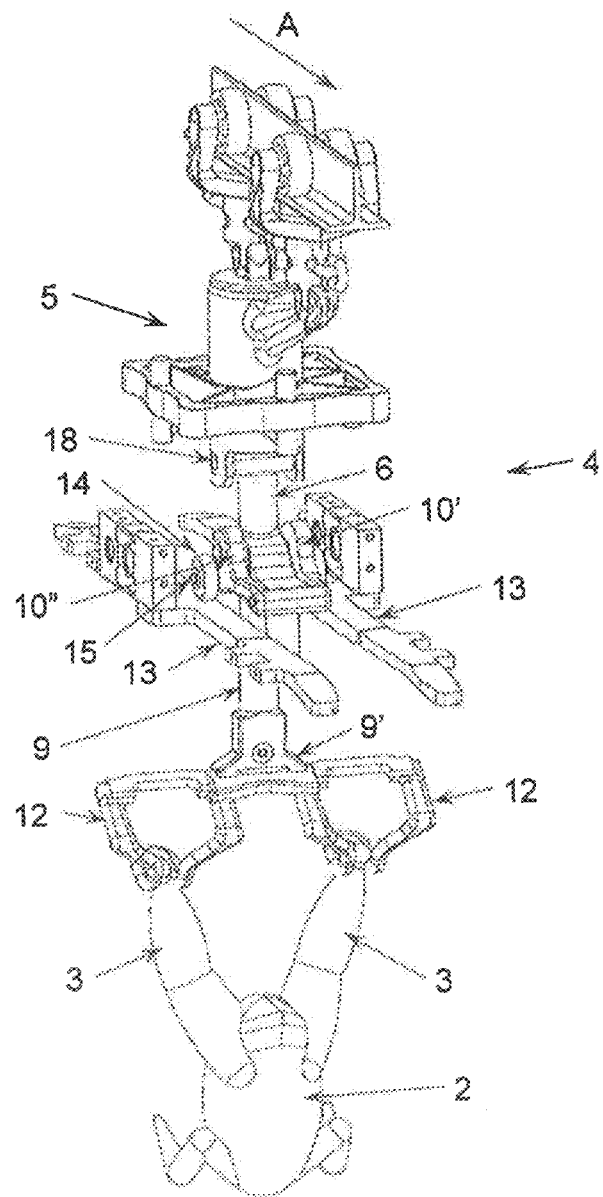
FIG. 4 is an isometric view of an exemplary carrier and part of a conveyor line at the location of the weighing scales of the conveyor line.

With reference to the second exemplary embodiment illustrated in FIGS. 2, 3 and 4, an exemplary conveyor line 1 for poultry 2 suspended by the legs 3 is shown. The conveyor line 1 is provided with at least one carrier 4 for the poultry 2. The carrier 4 includes a carriage 5 for moving the poultry 2 or poultry parts along a conveying direction of the conveyor line 1, as indicated with arrow A in FIG. 2 and FIG. 4. The carrier 4 is arranged with a vertical rotatable rod 6 that is pivotably suspended from the carriage 5 at hinge 18. This rotatable rod 6 is provided with a sideways extending arm 7 for adjusting an orientation of the poultry 2 or poultry parts with reference to the carriage 5 that is movable in the conveyor line 1.

The sideways extending arm 7 can be used for moving the poultry 2 aside and away from the conveying track of the conveyor line 1 to bypass processing means positioned in or along the track of the conveyor line 1. The arm 7 is at a position distant from the first rod 6, at which is also provided a hinge 8. A second rod 9 pivotably connects to the hinge 8 by means of an intermediate connection piece or structure 10 that sideways extends from the second rod 9. This can also be seen in FIG. 5 and FIG. 6.

FIGS. 5 and 6 further provide a clear picture of a feature in which the first rod 6 is provided with a stop 11 or stops for the intermediate connection piece or structure 10. Such stop 11 or stops prevent structure 10 and the second rod 9 connected thereto from swinging to a position below the stop 11. Accordingly, FIG. 5 shows that this feature arranges that the structure 10 comes to rest on the stops 11 so that when the structure 10 abuts against the stop 11 or stops, the second rod 9 substantially extends in the longitudinal direction of the first rod 6 or e.g., first and second rods 6 and 9 are substantially collinear. The figures further show that the hook or hooks 12 for suspending the poultry 2 are provided at a lower end 9' of the second rod 9.

When the structure 10 is lifted from the stop 11 or stops of the first rod 6, this enables an accurate measurement of the weight of the poultry 2 attached to the hook or hooks 12 at the lower end 9' of the second rod 9. Both FIGS. 4 and 6 show that the weight measurement is preferably carried out with weighing scales 13 placed in or next to the track of the conveyor line 1, wherein the intermediate structure 10 is provided with a supporting wheel or wheels 14 adjacent to the second rod 9 that are arranged to cooperate with the supporting surfaces 13' of the weighing scales 13. Accordingly, the wheels 14 transfer the load of the poultry 2 suspended by the legs 3 in the hooks 12 of the carrier 4 directly on the top surface 13' of the weighing scales 13.

It will be clear from FIGS. 2 through 4 but in particular from the detail view of FIG. 7A and FIG. 7B that, for this exemplary embodiment, the carrier 4 preferably has two wheels 14 on opposite sides of the second rod 9 wherein the wheels 14 are mounted on an axle 15 passing through a shaft or bore 16 in the structure 10. Axle 15 has a longitudinal body axis $LA_2$. According to an exemplary aspect of the invention, the shaft or bore 16 has convex bottom and top surfaces 16', 16". The bottom and top surfaces 16', 16" of the shaft or bore preferably each have an apex 17, 17' at the center of the shaft or bore 16 coinciding with a longitudinal body axis of the second rod 9. In an exemplary aspect of the invention, the distance D' along vertical direction V between bottom and top surfaces 16', 16" at apexes 17 and 17' is less than the distance D" along vertical direction V between bottom and top surfaces 17, 17' at extremities 19', 19"'. For example, shaft or bore 24 may have a cross-sectional area in the middle of the shaft or bore 16 (near apexes 17 and 17') that is circular, and a cross-sectional area on opposite extremities 19', 19" of the shaft or bore 16 that is oval so as to provide the axle 15 with play at the extremities 19', 19" of the shaft or bore 24.

One or more of such features enable that the wheels 14 on opposite sides of the second rod 9 have room to move to a slightly different level with respect to each other, to match possibly different levels of the supporting surfaces 13' of the weighing scales 13 placed on opposite sides of the track of the conveyor line. This promotes the accuracy of the weight measurement.

Although the invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to the embodiments. The scope of protection of the invention shall therefore be construed in accordance with the appended claims only, wherein a possible ambiguity in the wording of the claims shall be resolved using these exemplary embodiments.

What is claimed is:

1. A poultry processing line that includes a conveying track, comprising:
   at least one carriage movable along the conveying track, wherein poultry or poultry parts are or supportable by the carriage, the carriage defining a bore;
   a plurality of wheels, the wheel positioned on opposite sides of the carriage;
   an axle onto which the wheels are mounted, the axle guided through the bore;
   supports for the wheels positioned on opposing sides of the conveying track, wherein the wheels are movable along the supports such that the carriage can move along the conveying track;
   wherein, as viewed along a longitudinal direction of the bore, the bore comprises
      a convex inner top surface; and
      a convex inner bottom surface.

2. The poultry processing line according to claim 1, wherein the bore defines a center, and wherein the bottom and top surfaces of the bore have an apex at the center of the bore.

3. The poultry processing line according to claim 1, wherein at the center of the bore, the bore has a cross-sectional area that is circular, and wherein at opposite extremities of the bore, the bore has a cross-sectional area that is oval so as to provide the axle with play at the extremities of the bore.

4. The poultry processing line according to claim 1, further comprising a vertical rotatable rod that is pivotably suspended from the carriage.

5. The poultry processing line according to claim 4, a sideways extending arm connected with the sideways extending arm and configured for adjusting an orientation of the poultry.

6. A carriage for a poultry processing line that includes a conveying track, the carriage movable along the conveying track, the carriage comprising:
   a plurality of wheels, the wheel positioned on opposite sides of the carriage;
   an axle onto which the wheels are mounted, the axle extending through a bore supported by the carriage;
   wherein, as viewed along a longitudinal direction of the bore, the bore comprises
      a convex inner top surface; and
      a convex inner bottom surface.

7. The carriage for a poultry processing line as in claim 6, wherein the bore defines a center, and wherein the bottom and top surfaces of the bore have an apex at the center of the bore.

8. The carriage for a poultry processing line as in claim 6, wherein at the center of the bore, the bore has a cross-sectional area that is circular, and wherein at opposite extremities of the bore, the bore has a cross-sectional area that is oval so as to provide the axle with play at the extremities of the bore.

* * * * *